(12) United States Patent
Lomb et al.

(10) Patent No.: US 9,849,642 B2
(45) Date of Patent: Dec. 26, 2017

(54) METHOD FOR AVOIDING ENTRAPMENT OF AIR BUBBLES IN A LENS FORMING MATERIAL AND APPARATUS FOR CARRYING OUT THE METHOD

(71) Applicant: Novartis AG, Basel (CH)

(72) Inventors: Lukas Lomb, Mainaschaff (DE); Roland Schmieder, Friedrichsdorf (DE); Gabriela Cocora, Elsenfeld-Eichelsbach (DE); Halina Heidrich, Kahl am Main (DE); Axel Heinrich, Aschaffenburg (DE); Peter Hagmann, Waldburg (DE)

(73) Assignee: Novartis AG, Basel (CH)

( * ) Notice: Subject to any disclaimer, the term of this patent is extended or adjusted under 35 U.S.C. 154(b) by 423 days.

(21) Appl. No.: 14/573,472

(22) Filed: Dec. 17, 2014

(65) Prior Publication Data
US 2015/0174839 A1    Jun. 25, 2015

Related U.S. Application Data

(60) Provisional application No. 61/918,143, filed on Dec. 19, 2013.

(51) Int. Cl.
*B29D 11/00*    (2006.01)

(52) U.S. Cl.
CPC .. B29D 11/00125 (2013.01); B29D 11/00038 (2013.01); B29D 11/0048 (2013.01); *B29K 2883/005* (2013.01); *B29K 2909/08* (2013.01); *B29K 2995/001* (2013.01)

(58) Field of Classification Search
CPC ........ B29D 11/00125; B29D 11/00038; B29D 11/0048
See application file for complete search history.

(56) References Cited

U.S. PATENT DOCUMENTS

| 4,480,974 A | 11/1984 | Akutagawa |
| 2010/0222533 A1* | 9/2010 | Knorr ................ B01D 39/1692 526/255 |
| 2011/0074055 A1* | 3/2011 | Nakahashi ....... B29D 11/00009 264/1.36 |

FOREIGN PATENT DOCUMENTS

| JP | 5245880 A | 9/1993 |
| WO | 2008042277 A1 | 4/2008 |

OTHER PUBLICATIONS

PCT International Search Report dated Mar. 5, 2015, International Application No. PCT/EP2014/078111, International Filing Date Dec. 17, 2014.
PCT Written Opinion of the International Searching Authority dated Mar. 5, 2015, International Application No. PCT/EP2014/078111, International Filing Date Dec. 17, 2014.

* cited by examiner

*Primary Examiner* — Mathieu Vargot
(74) *Attorney, Agent, or Firm* — Robert A. Ambrose (57) ABSTRACT

A method for avoiding the entrapment of air bubbles (5) in a lens forming material, in particular in a low viscosity lens forming material, in an ophthalmic lens manufacturing process using mold halves (2; 3) each having a lens forming surface (21; 31) comprises electrostatically charging a predetermined portion of the lens forming surface (21; 31) of the mold half (2; 3) prior to the predetermined portion of the lens forming surface (21; 31) coming into contact with the lens forming material (4).

18 Claims, 5 Drawing Sheets

METHOD FOR AVOIDING ENTRAPMENT OF AIR BUBBLES IN A LENS FORMING MATERIAL AND APPARATUS FOR CARRYING OUT THE METHOD

This application claims the benefit under 35 USC §119(e) of U.S. provisional application Ser. No. 61/918,143 filed Dec. 19, 2013, incorporated herein by reference in its entirety.

FIELD

The invention relates to a method for avoiding entrapment of air bubbles in a lens forming material, in particular in a low viscosity lens forming material, in an ophthalmic lens manufacturing process, for example in a contact lens manufacturing process, and to an apparatus for carrying out the method.

BACKGROUND

Contact lenses, in particular soft contact lenses for single use, are nowadays produced in great volumes in highly automated manufacturing processes and facilities. These contact lenses can be manufactured using reusable male and female mold halves which are typically made of glass. When mated to form the mold these mold halves define a hollow mold cavity between the lens forming surfaces of the male and female mold halves, and this lens cavity corresponds to the shape of the contact lens to be formed. Prior to mating the male and female mold halves to close the mold a lens forming material which may be a polymer or pre-polymer solution is dosed into the female mold half. Suitable lens forming materials include polymers or pre-polymers based on polyvinyl alcohols (PVA), on silicone hydrogels (SiHy) or on polyethylene glycols (PEG), or other suitable lens forming materials as are known in the art. After closing the mold, the lens forming material contained in the mold cavity is cured through polymerization and/or cross-linking to form the contact lens.

During manufacturing of such contact lenses it may occur, that air bubbles get entrapped in the lens forming material. For example, such entrapment of air bubbles may occur in a boundary region of the lens forming material and the lens forming surface of the female mold half as the lens forming material is dispensed into the female mold half. Such entrapment may in particular occur when a lens forming material having a high viscosity is used. In case such highly viscous lens forming material is dispensed into the female mold half at the center of the female mold half, the surface of the female mold half may not get properly wetted and air bubbles may get entrapped which may not escape during further wetting of the lens forming surface. To avoid this, the material can be dispensed into the female mold half off-center. Another possibility of air bubble entrapment is at the boundary surface of the lens forming material and the male mold half as the male mold half is mated with the female mold half to close the mold. This may in particular occur with a lens forming material having a low viscosity (but may also occur with a highly viscous lens forming material). It is believed that the formation of air bubbles may be the result of a non-uniform and/or non-symmetric wetting of the respective mold half by the lens forming material. For example, as the male mold half is advanced towards the lens forming material contained in the female mold half, in case the first contact of the lens forming surface of the male mold half does not occur at a predefined single point this may result in a non-homogeneous wetting of the lens forming surface of the male mold half and to the entrapment of air bubbles. The entrapped air bubbles may lead to a poor lens quality, thus resulting in rejection of the contact lens.

SUMMARY

It is therefore an object of the invention to provide a remedy to the afore-mentioned problems of air bubble entrapment. To achieve this, in accordance with a first aspect the present invention suggests a method for avoiding the entrapment of air bubbles in a lens forming material as it is specified in the independent method claim. Embodiments of the method according to the invention are the subject of the dependent claims.

In particular, the invention suggests a method for avoiding entrapment of air bubbles in a lens forming material, in particular in a low viscosity lens forming material, in an ophthalmic lens manufacturing process using mold halves each having a lens forming surface, said method including the step of providing an electrostatic charge on a predetermined portion of said lens forming surface of at least one of said mold halves prior to said predetermined portion of said lens forming surface coming into contact with said lens forming material.

In some embodiments of the method according to the invention, said predetermined portion of said lens forming surface of said at least one mold half is a central portion of said lens forming surface.

In some further embodiments of the method according to the invention, said at least one mold half is a female mold half comprising a concavely shaped lens forming surface, and said electrostatic charge is provided on said predetermined portion of said concavely shaped lens forming surface of said female mold half prior to dispensing said lens forming material into said female mold half.

In still some further embodiments of the method according to the invention, said at least one mold half is a male mold half comprising a convexly shaped lens forming surface, and said electrostatic charge is provided on said predetermined portion of said convexly shaped lens forming surface of said male mold half prior to advancing said male mold half towards a female mold half containing said lens forming material, for mating said male and female mold halves.

In yet some further embodiments of the method according to the invention, said electrostatic charge is provided on said predetermined portion of said lens forming surface of said at least one mold half by contacting said predetermined portion of said lens forming surface of said at least one mold half with a stamp made of a material which is sufficiently far away in the triboelectric series from the material said at least one mold half is made of.

According to one embodiment of the method according to the invention, said at least one mold half is made of glass, preferably of quartz glass, and said stamp is made of silicone rubber.

In some embodiments of the method according to the invention, said contact between said lens forming surface and said stamp is accomplished for a time period of one second up to three seconds.

In some further embodiments of the method according to the invention, a central axis of said stamp is aligned with a central axis of said lens forming surface of said at least one mold half.

In accordance with a second aspect, the present invention suggests an apparatus for carrying out the afore-described method, this apparatus being specified in the independent apparatus claim.

In particular, the apparatus comprises a stamp and a carrier for at least one mold half, said stamp and said carrier being arranged relative to each other in a manner such that said stamp faces a predetermined portion of a lens forming surface of said at least one mold half, said stamp being made of a material which is sufficiently far away in the triboelectric series from the material said at least one mold half is made of, and said stamp and said carrier for said at least one mold half being movable towards and away from one another in a manner to allow said stamp to contact said predetermined portion of said lens forming surface of said at least one mold half for a predetermined time period to provide said charges on said predetermined portion of said lens forming surface of said at least one mold half.

In some embodiments the apparatus according to the invention further comprises a positioning system for aligning a central axis of said stamp with a central axis of said at least one mold half.

In some further embodiments the apparatus according to the invention said stamp is made of a material which is sufficiently far away in the triboelectric series from a material said at least one mold half is made of, to allow electrostatic charges to be provided on said predetermined portion of said lens forming surface of said at least one mold half upon contact with said stamp.

By providing an electrostatic charge on a predetermined portion of the lens forming surface of at least one of the mold halves a controlled first contact of the lens forming material with the predetermined portion of the lens forming surface of the said mold half is ascertained. The electrostatic charge on the predetermined portion of the lens forming surface, for example a positive charge, results in an attraction of the (polar) lens forming material to the said predetermined portion of the lens forming surface. Thus, the portion of first contact of the lens forming surface with the lens forming material may be controlled, thereby avoiding any arbitrary contacts which may include the risk of entrapment of air bubbles.

While the invention is advantageous with respect to both high viscosity lens forming materials, i.e. lens forming materials having a viscosity in the range of 1000 mPas to 10000 mPas (for example, 1400 mPas to 3000 mPas), and low viscosity lens forming materials, i.e. lens forming materials having a viscosity in the range of 0.5 mPas to 100 mPas (for example, 20 mPas to 27 mPas) it is particularly advantageous with respect to low viscosity lens forming materials.

For low viscosity lens forming materials, bubbles formed upon dispensing the lens forming material into the female mold half ("dosing bubbles") are not so much a problem since the lens forming material quickly and automatically spreads over the lens forming surface of the female mold half, in particular if the lens forming material is dispensed into the female mold half off-center. However, bubbles may occur during mating of the male and female mold halves as the male mold half approaches the female mold half, since due to the closely corresponding shapes of the lens forming surfaces of the male and female mold halves the lens forming material at the same time may make first contact with the lens forming surface of the male mold half at various locations (points). From these various points of first contact the lens forming material spreads over the lens forming surface of the male mold half and where the spreading lens forming material meets bubbles may be included ("forming bubbles"). Such "forming bubbles" can be avoided by the provision of an electrostatic charge on the lens forming surface of the male mold half.

The electrostatic charge on the predetermined portion of the lens forming surface of the male mold half and the convex shape of the lens forming surface of the male mold half generate an inhomogeneous electrical field between the lens forming surface of the male mold half and the lens forming material, this inhomogeneous electrical field being strongest at the center of the male mold half. As the male mold half approaches the female mold half during mating of the male and female mold halves, the forces generated by the relative movement of the (polar) molecules of the lens forming material in the inhomogeneous electrical field of the electrostatic charge and acting on the lens forming material are highest at the center of the male mold half (due to the inhomogeneous field being strongest at the apex of the male mold half). This results in a controlled first point of contact between the lens forming material and the lens forming surface of the male mold half at the center of the male mold half. From this first point of contact the lens forming material uniformly spreads across the lens forming surface of the male mold half, thus avoiding the inclusion of bubbles.

For high viscosity lens forming materials, the "dosing bubbles" can be avoided by the provision of an electrostatic charge on the lens forming surface of the female mold half. As the droplet of the lens forming material is discharged from the tip of a dosing needle and approaches the lens forming surface, the droplet deforms at its lowermost point due to the forces acting thereon which are caused by the electrical field generated between the electrostatic charge provided on the lens forming surface and the lens forming material (droplet). Again this results in a first point of contact at the center of the female mold half, and from this first point of contact the lens forming material uniformly spreads across the lens forming surface of the female mold half, thus avoiding the inclusion of bubbles.

While the above scenarios suggest the provision of the electrostatic charge on the male mold half or the female mold half, it goes without saying that the electrostatic charge can be provided on the lens forming surfaces of both the male and female mold halves, both for low viscosity lens forming materials as well as for high viscosity lens forming materials.

Although in general the invention works if electrostatic charges be provided on the entire lens forming surface of said mold half, in a preferred embodiment the predetermined portion of said lens forming surface of said mold half is the center or central portion of the mold half, so that the portion of first contact of the lens forming material and the lens forming surface of the said mold half is the center or central portion of the mold half. From there, the lens forming material symmetrically spreads across the lens forming surface whereby an even and uniform wetting of the lens forming surface is achieved. This eliminates or at least greatly reduces the risk of entrapment of air bubbles.

The electrostatic charging may be provided on the predetermined portion of the concavely shaped lens forming surface of a female mold half or to the convexly shaped lens forming surface of a male mold half or to both of them. In case the electrostatic charge is provided on the predetermined portion of the concavely shaped lens forming surface of the female mold half, this is accomplished prior to dispensing the lens forming material into the female mold half. In case the electrostatic charge is provided on the predetermined portion of the convexly shaped lens forming surface of the male mold half, this is accomplished prior to advancing the male mold half towards the female mold half containing the lens forming material, for mating the male and female mold halves to close the mold.

Providing the electrostatic charge can be performed by contacting the predetermined portion of the said mold half with a stamp. The material the stamp is made of is sufficiently far away in the triboelectric series from the material the said mold half is made of. The term "sufficiently far away in the triboelectric series" in this regard is to be understood in a sense such that upon contact of the stamp and the predetermined portion of the said mold half, an electrostatic charge is provided on the predetermined portion of the mold half. The electrostatic charging of the predetermined lens forming surface of the said mold half makes use of the triboelectric effect (contact electrification). In accordance with this effect a material may become electrostatically charged by bringing it into contact with another material. As outlined above, the reusable mold halves used in the fully automated process of manufacturing contact lenses can be made of glass or quartz glass, which is close to the positive end of the triboelectric series. Silicone rubber, on the other hand, is located close to the negative end of the triboelectric series. Therefore, contacting the predetermined portion of the lens forming surface of a mold half made of glass or quartz glass with a silicone rubber stamp results in a positive electrostatic charge being provided on the lens forming surface.

In order to ascertain that sufficient electrostatic charges are provided on the predetermined portion of the lens forming surface the contact between the lens forming surface and the silicone rubber stamp may be accomplished for a time period of one second up to three seconds. While generally the contact may be accomplished for longer time periods, too, a time period of one second up to three seconds is sufficient for providing sufficient electrostatic charges on the predetermined portion of the lens forming surface for the intended purpose, so that efficiency of this process step can be ascertained. By way of example, suitable contact forces of the silicone rubber stamp and the predetermined portion of the lens forming surface are in the range of 5 Newton (N) up to 35 Newton (N). Thereafter, the stamp is removed from the predetermined portion of the lens forming surface. Also by way of example only, the removal speed may be in the range of 0.5 meters per second (m/s) and 5 meters/second (m/s), and the acceleration may be in the range of 5 m/s$^2$ to 50 m/s$^2$.

In order to be able to provide the electrostatic charge on the central portion of the lens forming surface a central axis of the silicone rubber stamp may be aligned with a central axis of the lens forming surface of the mold half, and this alignment may, for example, be performed with a radial accuracy in the range of 0.1 mm-0.3 mm. To achieve this accuracy, the apparatus may comprise a suitable positioning system comprising sensors for determining the actual position of the central axis of the mold half and the actual position of the central axis of the stamp, and may comprise drives or other alignment mechanisms for properly aligning the positions of the stamp and the mold half should this be necessary.

BRIEF DESCRIPTION OF THE DRAWINGS

Further details and advantages of the invention become apparent from the following description of embodiments thereof, reference being made to the drawings in which.

DETAILED DESCRIPTION OF EMBODIMENTS

Figure 1:
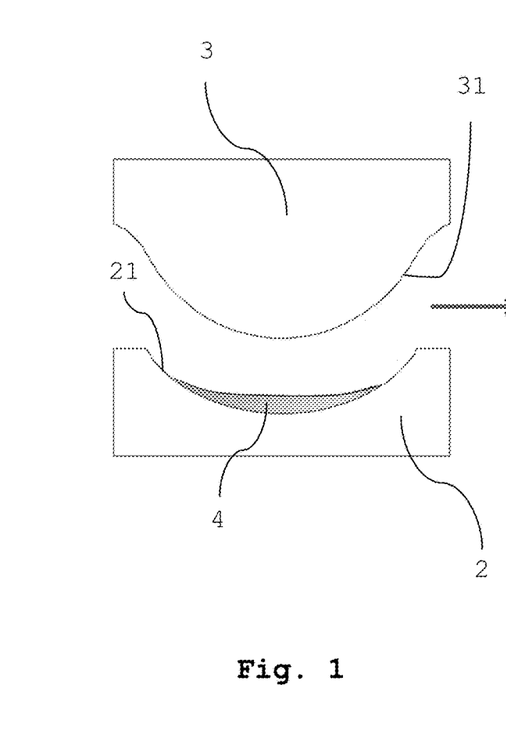
FIGS. 1-3 show three consecutive stages of mating a female and a male mold half of a contact lens mold during closing of the mold in a conventional contact lens manufacturing process, with the female mold half containing a lens forming material.
Figure 2:
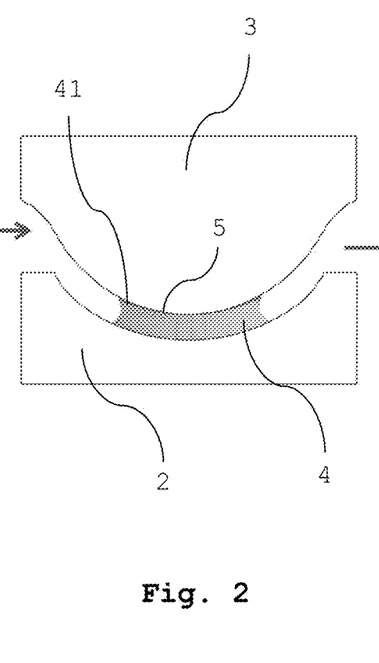
Figure 3:
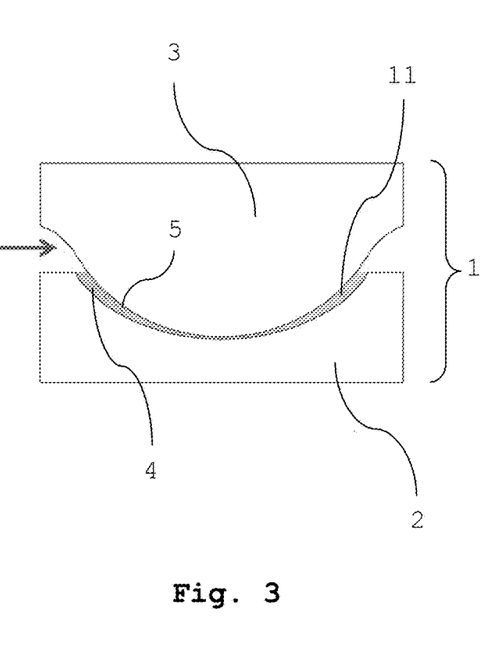

In FIGS. 1-3 three consecutive stages of mating a female and a male mold half in a conventional contact lens manufacturing process are shown. Female mold half 2 and male mold half 3 together form a lens mold 1. Female mold half 2 comprises a concavely shaped lens forming surface 21 determining the shape of a front surface of a contact lens to be molded. Correspondingly, male mold half 3 comprises a convexly shaped lens forming surface 31 determining the shape of the back surface of the contact lens to be molded. In the closed state of lens mold 1 the concavely shaped lens forming surface 21 and the convexly shaped lens forming surface 31 delimit a mold cavity 11. It is to be noted that for the sake of simplification in the drawings any means or measures for determining the shape of the edges of the contact lenses to be molded are not shown because they are not important for the understanding of the instant invention. At least the concavely shaped lens forming surface 21 and the convexly shaped lens forming surface 31, but preferably the entire female mold half 2 and the entire male mold half 3 are made of glass, for example from quartz glass or BK7 (commercially available from the company Schott, Germany).

FIG. 1 shows a stage in which a lens forming material 4 has already been dispensed into the female mold half 2 and is contained in the female mold half 2, immediately prior to advancement of the male mold half 3 towards the female mold half 2. FIG. 2 shows a stage in which the male mold half 2 has been advanced towards the female mold half 2 to an extent that the lens forming material 4 is in contact with the convexly shaped lens forming surface 31 of the male mold half. As can be seen, in a boundary region 41 of the lens forming material 4 and the convexly shaped lens forming surface 31 of the male mold half 3 air bubbles 5 may be entrapped. As already explained above, the formation of air bubbles 5 may be the result of a non-controlled, non-single-point of the initial contact of the lens forming material 4 with the convexly shaped lens forming surface 31. FIG. 3 shows a stage in which the male mold half 3 and the female mold half 2 (and thus the mold 1) are closed. The lens forming material 4 completely fills the mold cavity 11. The air bubbles 5 ("forming bubbles") entrapped in the lens forming material 4 have been displaced towards a peripheral region of the mold cavity 11, however, they are not destroyed during the following curing of the lens forming material through polymerization and/or cross-linking of the lens forming material 4, so that they remain included in the final contact lens. This is not acceptable, and thus, the lens with the entrapped air bubbles will be rejected during inspection of the contact lens.

Figure 4:
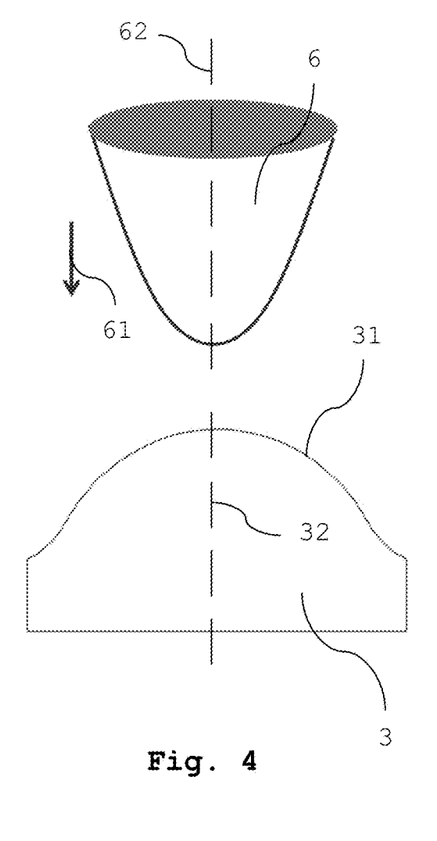
FIGS. 4-6 show three consecutive stages of the step of contacting a central portion of the male mold half with a silicone rubber stamp to provide electrostatic charges on the central portion of the male mold half, in accordance with an embodiment of the invention.
Figure 5:
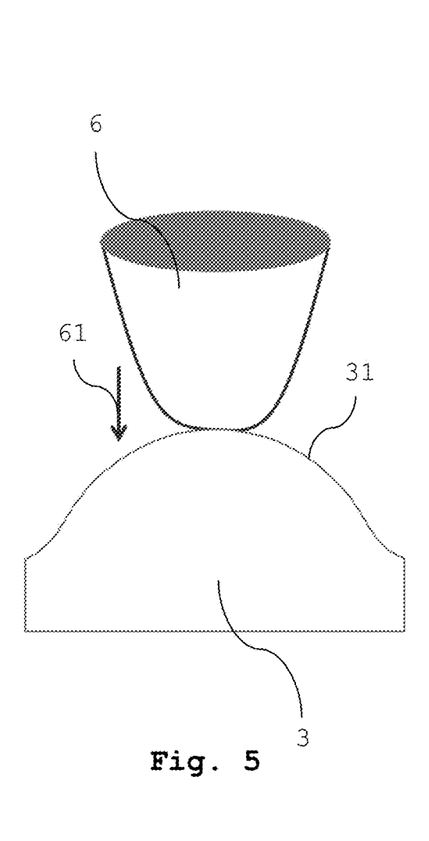
Figure 6:
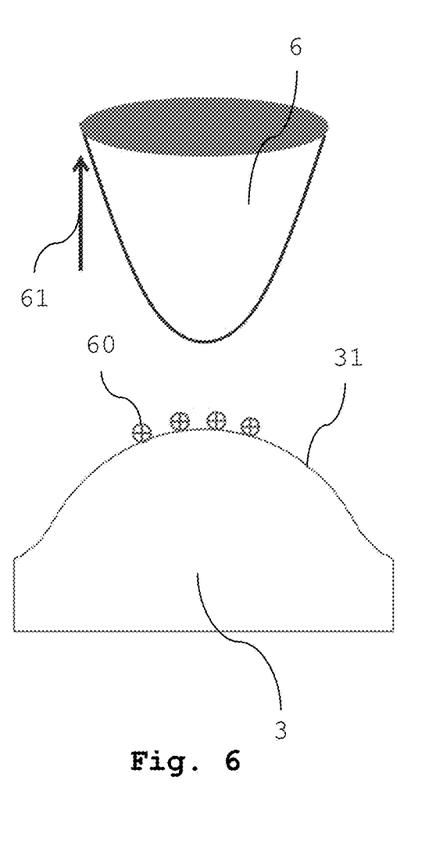

In FIGS. 4-6 an essential step of an embodiment of the method according to the invention is illustrated, which provides a remedy to the problem of entrapment of air bubbles 5. For that purpose, an electrostatic charge 60 is provided on the central portion of the convexly shaped lens forming surface 31 of the male mold half 3, using (for example) a silicone rubber stamp 6, prior to that convexly shaped lens forming surface 31 coming into contact with the lens forming material 4. A typical time period for the contact of the silicone rubber stamp 6 on the surface 31 is one second up to three seconds, without being limited thereto, and a typical contact force is in the range of five Newton up to thirty-five Newton, again without being limited thereto.

FIG. 4 shows the male mold half 3 comprising the convexly shaped lens forming surface 31. Opposite to the convexly shaped lens forming surface 31 (which is made of glass) there is arranged a silicone rubber stamp 6. Silicone rubber stamp 6 is movable towards the convexly shaped lens forming surface 31 of male mold half 3, this being indicated by arrow 61. As can be seen in FIG. 5, silicone rubber stamp 6 contacts a central portion of the convexly shaped lens forming surface 31 of male mold half 3. In order to enhance the positioning accuracy of the silicone rubber stamp 6 with respect to the male lens forming surface 31 a central axis 62 of the silicone rubber stamp 6 may be aligned with a central axis 32 of the concavely shaped lens forming surface 31 of male mold half 3, and this is preferably done with an accuracy in the range of 0.1 mm-0.3 mm. For that purpose there may be provided a positioning system (not shown) comprising sensors for determining the actual relative position of the silicone rubber stamp 6 with respect to the male mold half 3. In addition, drives or other alignment mechanisms may be provided for properly aligning the silicone rubber stamp 6 and the male mold half 3 should this be necessary. In general, the area contacted by stamp 6 may range from a very small point to a significant portion of the area of the forming surface 31, depending on the contact force of stamp 6 upon the surface 31; as can be seen in FIG. 5 the silicone rubber stamp 6 is capable of being deformed as it is pressed into contact with forming surface 31. By way of example, the area contacted by stamp 6 may suitably range from about a 1 mm diameter sized contact area up to about a 10 mm diameter, or from about 2 mm to about 9 mm, or from about 6 mm to about 8 mm. In a particular example, the area contacted by stamp 6 may suitably have about an 8 mm diameter sized contact area.

FIG. 6 illustrates the result of the contact of the silicone rubber stamp 6 and the central portion of the convexly shaped lens forming surface 31 of the male mold half 3. In a triboelectric series, glass (or quartz glass) is located near the positive end of the triboelectric series while silicone rubber is located near the other, negative end of the triboelectric series. If these materials (glass and silicone rubber) are brought into frictional contact with each other, charge is transferred between the glass and the silicone rubber. Accordingly, due to the contact of the silicon rubber stamp 6 and the central portion of convexly shaped lens forming surface 31 a negative charge is transferred to the silicone rubber stamp 6. Thereafter, silicone rubber stamp 6 is moved away from the male mold half 3 again (again indicated by arrow 61), leaving behind the convexly shaped lens forming surface 31 carrying a positive electrostatic charge 60.

It is to be noted, that while the method of providing the electrostatic charge on a predetermined (here: central) portion of the lens forming surface of a mold half has been described with reference to a convexly shaped lens forming surface of a male mold half, this can be likewise accomplished with a concavely shaped lens forming surface of a female mold half. The silicone rubber stamp then is brought into contact with the predetermined portion of the concavely shaped lens forming surface of a female mold half in a manner corresponding to that described above with reference to the male mold half.

Figure 7:
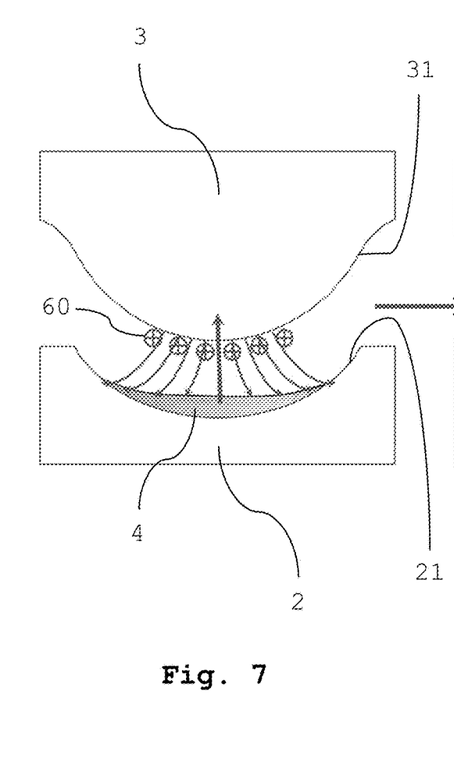
FIGS. 7-9 show three consecutive stages of mating a female and a male mold half after the electrostatic charges have been provided on the central portion of the male mold half as shown in FIGS. 4-6.
Figure 8:
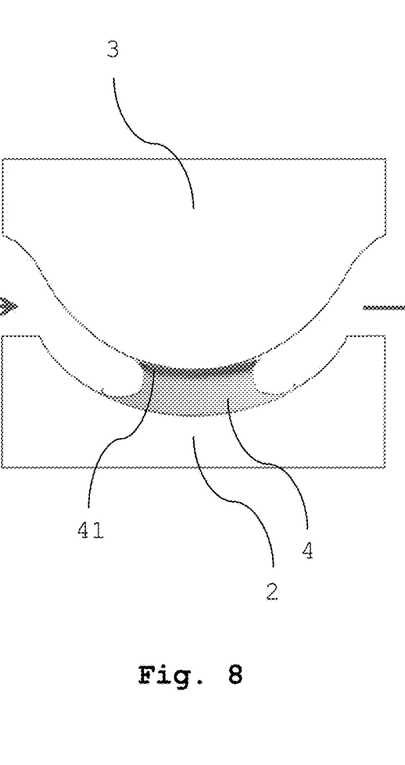
Figure 9:
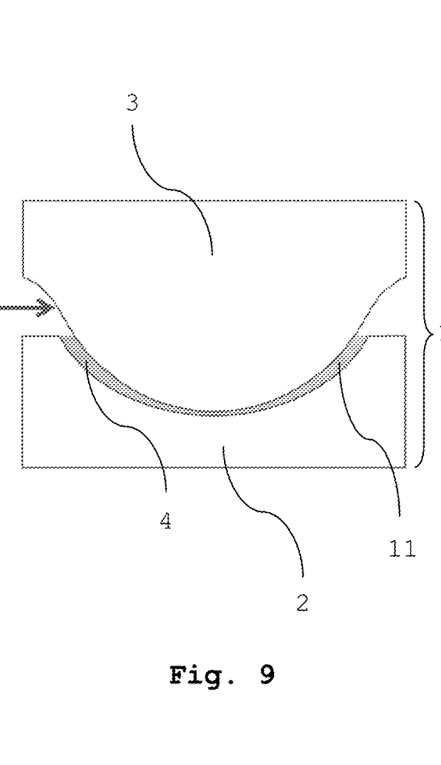

In FIGS. 7-9 three consecutive stages of mating the male mold half 3 with the female mold half 2 are illustrated, however, with the electrostatic charge 60 being provided on the central portion of the convexly shaped lens forming surface 31 of the male mold half 3.

Figure 11:
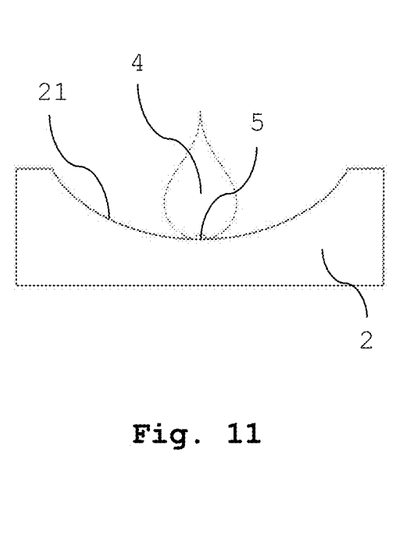
Figure 12:
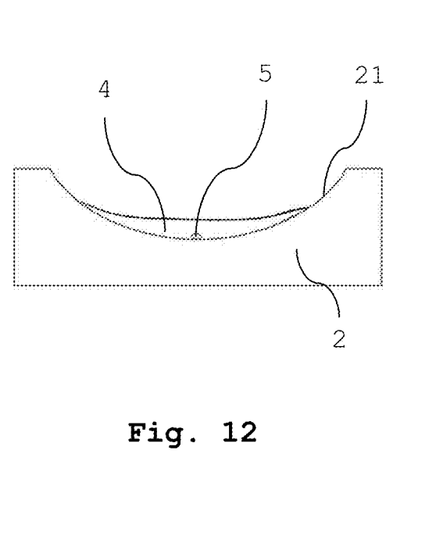
Figure 14:
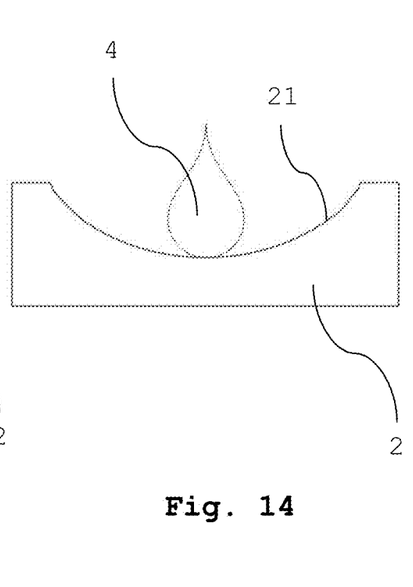
Figure 15:
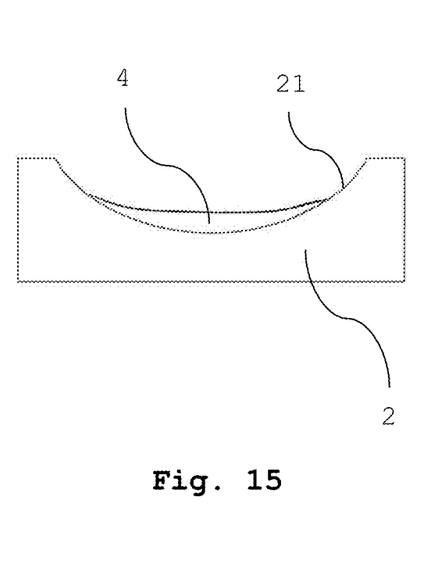

FIG. 7 shows a stage in which a lens forming material 4 has already been dosed into and is contained in the female mold half 2, immediately prior to advancement of the male mold half 3 towards the female mold half 2. As already mentioned, the convexly shaped lens forming surface 31 of male mold half 3 now carries a positive electrostatic charge 60. Due to the forces generated by the relative movement of the (polar) lens forming material in the inhomogeneous electrical field of the positive electrostatic charge on the central portion of the convexly shaped lens forming surface 31, and further due to the central portion (around and including the apex) of the convexly shaped lens forming surface 31 having the smallest distance to the lens forming material 4 the first contact of the lens forming material is controlled to occur at the central portion of the convexly shaped lens forming surface 31. This can be seen best in FIG. 8. Once the male mold half 3 and the female mold half 2 have been advanced together close enough, wetting of the male lens forming surface 31 starts from a single, well-defined first point of contact (or from a very small continuous area of first contact) and occurs uniformly across the convexly shaped lens forming surface 31 of male mold half 3 with no entrapment of air bubbles occurring in the boundary region 41 of the lens forming material 4 and the convexly shaped lens forming surface 31 of the male mold half 3. FIG. 9 finally shows a stage in which the mold 1 is fully closed. The lens forming material 4 completely fills the mold cavity 11 and is ready for being cured to form the contact lens It has been explained already above, that in accordance with a further embodiment an electrostatic charge can be provided on a concavely shaped lens forming surface 21 of the female mold half 2. Three consecutive stages of dispensing a lens forming material 4 into a female mold half 2 are shown in FIGS. 10-12 without an electrostatic charge being provided on the concavely shaped lens forming surface 12 of the female mold half 2, while FIGS. 13-15 show the same three consecutive stages of dispensing a lens forming material 4 into a female mold half 2, however, with an electrostatic charge being provided on the concavely shaped lens forming surface 21 of the female mold half 2 prior to dispensing the lens forming material 4 into the female mold half 2.

Figure 10:
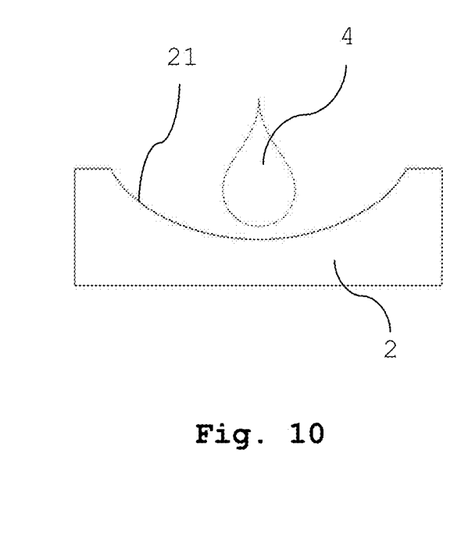
FIGS. 10-12 show three consecutive stages of dispensing a lens forming material into a female mold half in a conventional contact lens manufacturing process.

FIG. 10 shows the lens forming material 4 just before it reaches the (uncharged) central portion of the concavely shaped lens forming surface 21 of female mold half 2. FIG. 11 shows the lens forming material 4 at that moment when it reaches the central portion of the concavely shaped lens forming surface 21. Since the first contact of the lens forming material 4 may not necessarily occur at a single point and may not uniformly spread across the concavely shaped lens forming surface 21 one or more air bubbles 5 (only one being shown in FIG. 11) may be entrapped at a boundary region of the lens forming material 4 and the concavely shaped lens forming surface 21. FIG. 12 finally shows the situation when the lens forming material has wetted and spread across the female lens forming surface 21. The entrapped air bubble 5 ("dosing bubble") remains in place and is included in the contact lens once the lens forming material 4 has been cured to form the contact lens. This is not acceptable and results in the lens being rejected after inspection. The afore-described scenario is more likely to occur with lens forming materials 4 having a high viscosity than with lens forming materials having a low viscosity. In order to avoid entrapment of such air bubbles the lens forming material has been dispensed into the female mold half off-center. And while dispensing of the lens forming material into the female mold half off-center results in an improved yield there may still be occurrences where such air bubbles are included in the final contact lenses so that these contact lenses are rejected during inspection.

Figure 13:
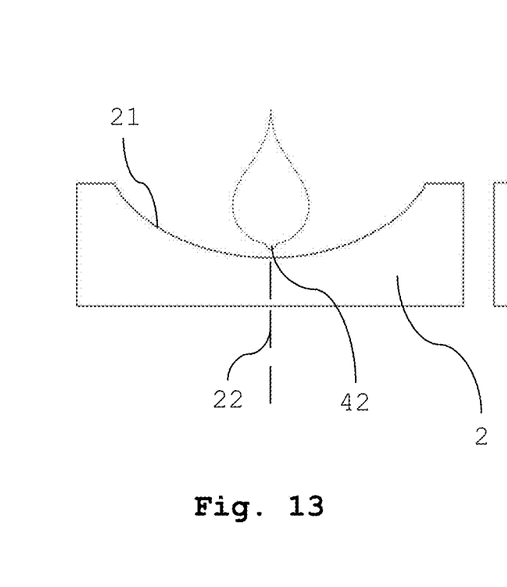
FIGS. 13-15 show three consecutive stages of a dispensing a lens forming material into a female mold half onto the central portion of which electrostatic charges have been provided in a manner similar to that shown in FIGS. 4-6.

FIG. 13 (similar to FIG. 10) shows the lens forming material 4 just before it reaches the central portion of the concavely shaped lens forming surface 21 of the female mold half 2. This time, however, a positive electrostatic charge (not shown) is provided on the central portion of the concavely shaped lens forming surface 21 prior to dispensing the lens forming material 4 into the female mold half 2. Providing the electrostatic charge on the central portion of the concavely shaped lens forming surface 21 of female mold half 2 is accomplished in a manner corresponding to that explained above with respect to the male mold half. Alignment of the central axis 62 of the stamp 6 with the central axis 22 of the concavely shaped lens forming surface 21 of female mold half 2 is also performed in a manner similar to that described with respect to the male mold half, and the area of forming surface 21 contacted by the stamp 6 may range similarly. The positive electrostatic charge exerts a force on the (polar) lens forming material 4 which results in a slight deformation of the lens forming material 4 (small deformation at the lowermost apex of the droplet, the deformation being shown exaggeratedly large in the drawing for the sake of clarity). This results in the first contact of the lens forming material 4 occurring at the center of the lens forming surface 21 of the female mold half, and subsequently leads to a symmetrical and uniform spreading of the lens forming material across the concavely shaped lens forming surface 21 starting at the center of the concavely shaped lens forming surface 21. As can be seen best in FIG. 14 no air bubbles are included as the lens forming material 4 starts to spread across the concavely shaped lens forming surface 21. FIG. 15 finally shows the lens forming material 4 after it has evenly spread across the female lens forming surface 21 of the female mold half 2 and before the male mold half is advanced towards it for closing the mold and for subsequent curing of the lens forming material to form the contact lens.

Although the invention has been described with reference to specific embodiments, it is evident to the person skilled in the art that this embodiment stands only by way of example for the general teaching underlying the present invention, and that various changes and modifications are conceivable without departing from that teaching. Therefore, the invention is not intended to be limited to the embodiments described, but rather its scope is defined by the appended claims.

The invention claimed is:

1. A method for avoiding entrapment of air bubbles (5) in a lens forming material (4), in an ophthalmic lens manufacturing process using mold halves (2; 3) each having a lens forming surface (21; 31), said method including the step of providing an electrostatic charge (60) on a predetermined portion of said lens forming surface (21; 31) of at least one of said mold halves (2; 3) prior to said predetermined portion of said lens forming surface (21; 31) coming into contact with said lens forming material (4);
   wherein said electrostatic charge (60) is provided on said predetermined portion of said lens forming surface (21; 31) of said at least one mold half (2; 3) by contacting said predetermined portion of said lens forming surface (21; 31) of said at least one mold half (2; 3) with a stamp (6) made of a material which is sufficiently far away in the triboelectric series from the material said at least one mold half (2; 3) is made of, and;
   further wherein said electrostatic charge is provided by contacting said predetermined portion with said stamp in a contact area having a diameter of from about 6 mm to about 8 mm.

2. The method according to claim 1, wherein said predetermined portion of said lens forming surface (21; 31) of said at least one mold half (2; 3) is a central portion of said lens forming surface (21; 31).

3. The method according to claim 1, wherein said at least one mold half is a female mold half (2) comprising a concavely shaped lens forming surface (21), and wherein said electrostatic charge (60) is provided on said predetermined portion of said concavely shaped lens forming surface (21) of said female mold half (2) prior to dispensing said lens forming material (4) into said female mold half (2).

4. The method according to claim 2, wherein said at least one mold half is a female mold half (2) comprising a concavely shaped lens forming surface (21), and wherein said electrostatic charge (60) is provided on said predetermined portion of said concavely shaped lens forming surface (21) of said female mold half (2) prior to dispensing said lens forming material (4) into said female mold half (2).

5. The method according to claim 1, wherein said at least one mold half is a male mold half (3) comprising a convexly shaped lens forming surface (31), and wherein said electrostatic charge (60) is provided on said predetermined portion of said convexly shaped lens forming surface (31) of said male mold half (3) prior to advancing said male mold half (3) towards a female mold half (2) containing said lens forming material (4) for mating said male and female mold halves (3; 2).

6. The method according to claim 2, wherein said at least one mold half is a male mold half (3) comprising a convexly shaped lens forming surface (31), and wherein said electrostatic charge (60) is provided on said predetermined portion of said convexly shaped lens forming surface (31) of said male mold half (3) prior to advancing said male mold half (3) towards a female mold half (2) containing said lens forming material (4) for mating said male and female mold halves (3; 2).

7. The method according to claim 1, wherein said predetermined portion of said lens forming surface (21; 31) of said at least one mold half (2; 3) is a central portion of said lens forming surface (21; 31).

8. The method according to claim 7, wherein said at least one mold half is a female mold half (2) comprising a concavely shaped lens forming surface (21), and wherein said electrostatic charge (60) is provided on said predetermined portion of said concavely shaped lens forming surface (21) of said female mold half (2) prior to dispensing said lens forming material (4) into said female mold half (2).

9. The method according to claim 1, wherein said at least one mold half (2; 3) is made of glass or quartz glass, and wherein said stamp (6) is made of silicone rubber.

10. The method according to claim 1, wherein said contact between said lens forming surface (21; 31) and said stamp (6) is accomplished for a time period of one second up to three seconds.

11. The method according to claim 9, wherein said contact between said lens forming surface (21; 31) and said stamp (6) is accomplished for a time period of one second up to three seconds.

12. The method according to claim 1, wherein a central axis (62) of said stamp (6) is aligned with a central axis (22; 32) of said lens forming surface (21; 31) of said at least one mold half (2; 3).

13. The method according to claim 9, wherein a central axis (62) of said stamp (6) is aligned with a central axis (22; 32) of said lens forming surface (21; 31) of said at least one mold half (2; 3).

14. The method according to claim 10, wherein a central axis (62) of said stamp (6) is aligned with a central axis (22; 32) of said lens forming surface (21; 31) of said at least one mold half (2; 3).

15. An apparatus for avoiding entrapment of air bubbles (5) in a lens forming material (4) in an ophthalmic lens manufacturing process, the apparatus comprising a stamp (6) and a carrier for at least one mold half (2; 3), said stamp (6) and said carrier being arranged relative to each other in a manner such that said stamp (6) faces a predetermined portion of a lens forming surface (21; 31) of said at least one mold half (2; 3), wherein said stamp (6) is made of a material which is sufficiently far away in the triboelectric series from the material said at least one mold half (2; 3) is made of, and wherein said stamp (6) and said carrier of said at least one mold half (2; 3) are movable towards and away from one another in a manner to allow said stamp (6) to contact said predetermined portion of said lens forming surface (21; 31) of said at least one mold half (2; 3) in a contact area having a diameter of from about 6 mm to about 8 mm, and for a predetermined time period to provide said charges on said predetermined portion of said lens forming surface (21; 31) of said at least one mold half (2; 3).

16. The apparatus according to claim 15, further comprising a positioning system for aligning a central axis (62) of said stamp (6) with a central axis (22; 32) of said at least one mold half (2; 3).

17. The apparatus according to claim 15, wherein said stamp (6) is made of a material which is sufficiently far away in the triboelectric series from a material said at least one mold half (2; 3) is made of, to allow electrostatic charges to be provided on said predetermined portion of said lens forming surface (21; 31) of said at least one mold half (2; 3) upon contact with said stamp (6).

18. The apparatus according to claim 16, wherein said stamp (6) is made of a material which is sufficiently far away in the triboelectric series from a material said at least one mold half (2; 3) is made of, to allow electrostatic charges to be provided on said predetermined portion of said lens forming surface (21; 31) of said at least one mold half (2; 3) upon contact with said stamp (6).

* * * * *